(12) United States Patent
Chou et al.

(10) Patent No.: US 10,719,825 B2
(45) Date of Patent: Jul. 21, 2020

(54) METHOD AND SYSTEM FOR SECURE PROTOCOL EXCHANGE

(71) Applicant: Bank of America Corporation, Charlotte, NC (US)

(72) Inventors: Henry J. Chou, Cornelius, NC (US); Jennifer M. Lucas, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 1225 days.

(21) Appl. No.: 14/996,404

(22) Filed: Jan. 15, 2016

(65) Prior Publication Data

US 2016/0224978 A1    Aug. 4, 2016

Related U.S. Application Data

(63) Continuation of application No. 13/901,764, filed on May 24, 2013, now abandoned.

(51) Int. Cl.
| | |
|---|---|
| *G06Q 20/06* | (2012.01) |
| *G06Q 20/38* | (2012.01) |
| *G06Q 20/10* | (2012.01) |
| *G06Q 20/22* | (2012.01) |
| *G06Q 20/40* | (2012.01) |
| *G06Q 20/14* | (2012.01) |

(52) U.S. Cl.
CPC ......... *G06Q 20/3823* (2013.01); *G06Q 20/06* (2013.01); *G06Q 20/10* (2013.01); *G06Q 20/108* (2013.01); *G06Q 20/14* (2013.01); *G06Q 20/227* (2013.01); *G06Q 20/401* (2013.01); *G06Q 20/405* (2013.01)

(58) Field of Classification Search
None
See application file for complete search history.

(56) References Cited

U.S. PATENT DOCUMENTS

| | | | | | |
|---|---|---|---|---|---|
| 5,677,955 | A | * | 10/1997 | Doggett | G06Q 20/02 235/379 |
| 6,021,202 | A | * | 2/2000 | Anderson | G06Q 30/06 705/54 |

(Continued)

FOREIGN PATENT DOCUMENTS

WO    WO 96/31965    * 10/1996    ............... H04K 1/00

OTHER PUBLICATIONS

Endorse Checks Payable to Multiple People by Justin Pritchard, <http://banking.about.eom/od/checkingaccounts/a/>endorse_check_multiple_payee.htm, accessed May 24, 2013.
How Do I Cash My Insurance Check if It Is Written Out to Me & My Lien Holder? by Ciaran John, <http://www.ehow>.corn/how_8330725_do-written-out-lien-holder.html, 4 pages, accessed May 24, 2013.

(Continued)

*Primary Examiner* — Olabode Akintola
(74) *Attorney, Agent, or Firm* — Banner & Witcoff, Ltd.; Michael A. Springs (57) ABSTRACT

A system and method using a protocol exchange server providing bi-directional exchange of secure data protocol attributes between a first computer system and a second computer system, the method include at a protocol exchange server for bi-directional exchange of secure data protocol attributes between a first computer system and a second computer system, electronically storing a plurality of computer readable attribute records in a computer database for users associated with the first computer system and the second computer system.

9 Claims, 7 Drawing Sheets

(56) References Cited

U.S. PATENT DOCUMENTS

| | | | |
|---|---|---|---|
| 7,003,473 B2 * | 2/2006 | Curtis | G06Q 30/0201 705/7.29 |
| 7,032,005 B2 * | 4/2006 | Mathon | G06Q 30/06 709/206 |
| 7,216,801 B1 | 5/2007 | Crews et al. | |
| 7,512,564 B1 * | 3/2009 | Geer | G06Q 20/042 705/44 |
| 7,606,787 B2 | 10/2009 | Keown et al. | |
| 7,664,304 B2 | 2/2010 | Houle et al. | |
| 7,680,716 B1 | 3/2010 | Bent et al. | |
| 8,009,820 B2 * | 8/2011 | Curtis | G06Q 10/06311 379/221.02 |
| 8,090,635 B1 | 1/2012 | Roitburg | |
| 8,254,658 B2 | 8/2012 | Hamilton | |
| 8,386,383 B1 | 2/2013 | Bent et al. | |
| 2004/0000987 A1 | 1/2004 | De Souza et al. | |
| 2005/0097019 A1 | 5/2005 | Jacobs | |
| 2008/0086420 A1 * | 4/2008 | Gilder | G06Q 20/04 705/44 |
| 2009/0076954 A1 * | 3/2009 | Carmody | G06Q 20/10 705/40 |

OTHER PUBLICATIONS

Insurance Checks Can Create Another Headache by Russ Lay, dtd Dec. 6, 2011, <http://outerbanksvoice>.com/2011/12/06/insurance-checks-can-create-another-headache/, 5 pages, accessed May 24, 2013.

Final Office Action dated Jul. 22, 2015 corresponding to U.S. Appl. No. 13/901,764.

Non-Final Office Action dated Jan. 6, 2015 corresponding to U.S. Appl. No. 13/901,764.

* cited by examiner

METHOD AND SYSTEM FOR SECURE PROTOCOL EXCHANGE

CROSS REFERENCE TO RELATED APPLICATIONS

The present application is a continuation and claims priority to U.S. application Ser. No. 13/901,764, filed on May 24, 2013, now abandoned, the entire disclosure of which is incorporated herein by reference.

BACKGROUND

There exists a need in the art for technology system for message protocols products and packages that communicate seamless on a wide-area network (WAN), a local-area network (LAN), a wireless network, a digital subscriber line (DSL) network, a frame relay network, an asynchronous transfer mode (ATM) network, a virtual private network (VPN).

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Aspects of the present disclosure are directed to a computer implemented method using a protocol exchange server providing bi-directional exchange of secure data protocol attributes between a first computer system and a second computer system, the method comprising: at a protocol exchange server for bi-directional exchange of secure data protocol attributes between a first computer system and a second computer system, electronically storing a plurality of computer readable attribute records in a computer database for users associated with the first computer system and the second computer system.

In a further aspect, at the protocol exchange server, using an encrypted communications data link, electronically, receiving data from a first Electronic Data Interchange (EDI) message payload including attribute data representative of a monetary value amount, and an attribute data endorsement request associated with at least one record from the computer record database requiring multiple endorsements, wherein the first EDI message payload includes a record header and lienholder data attribute being associated with the second computer system. At a protocol exchange server, electronically, extracting data values from the first Electronic Data Interchange (EDI) message payload including the record header, the lienholder data attribute, the attribute data representative of a monetary value amount, the attribute data endorsement request.

In a further aspect, at the protocol exchange server, electronically processing and determining via executing computer readable instructions comparing the extracted attribute data representative of the monetary value amount of the first EDI message payload to a predetermined threshold monetary value associated with at least one record related to the second computer system so as to determine whether the extracted monetary value amount is less than the predetermined threshold monetary value; if true, then generating a data attribute approval code associated with the attribute data endorsement request of the first EDI message payload to a computer processor associated with the second computer system.

At further aspect, at the protocol exchange server, responsive to the attribute data endorsement request and attribute data of the monetary value associated with the first EDI message payload having the data attribute approved code; transmitting via an encrypted data link, a second EDI message payload including at least the record identifier attribute data, and attribute data representative of the multiple endorsement to the first computer system.

In one aspect, methods and systems for multiple payee endorsement processing can be implemented. In one aspect, a system or method may include steps of electronically maintaining a plurality of accounts for users associated with a first financial entity and a second financial entity. Then electronically, receiving EDI data representative of a monetary fund amount, and an endorsement request associated with at least one account requiring multiple endorsements. Subsequently, electronically determining whether the endorsement request to the second financial entity is in accordance with a predetermined approval policy or guidelines. And responsive to the endorsement request being approved, transmitting EDI data representative of the endorsement to the first financial entity.

In one aspect, a system or method may include the EDI data representative of endorsement request approval notification comprising an electronic message.

In one aspect, a system or method may include transmitting EDI data representative of a first portion of the monetary fund amount to the first financial entity, the first portion being less than the monetary fund amount.

In one aspect, a system or method may include transmitting EDI data representative of a second portion of the monetary fund amount to the first financial entity, the second portion being defined the balance of the monetary fund amount minus the first portion.

In one aspect, a system or method may include transmitting EDI data representative of an endorsement approval code to a financial entity.

In another aspect, a system or method may include the endorsement of the user and the endorsement of the second financial entity.

In another aspect, a system or method may include enabling distribution of the amount of monetary funds to the user.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
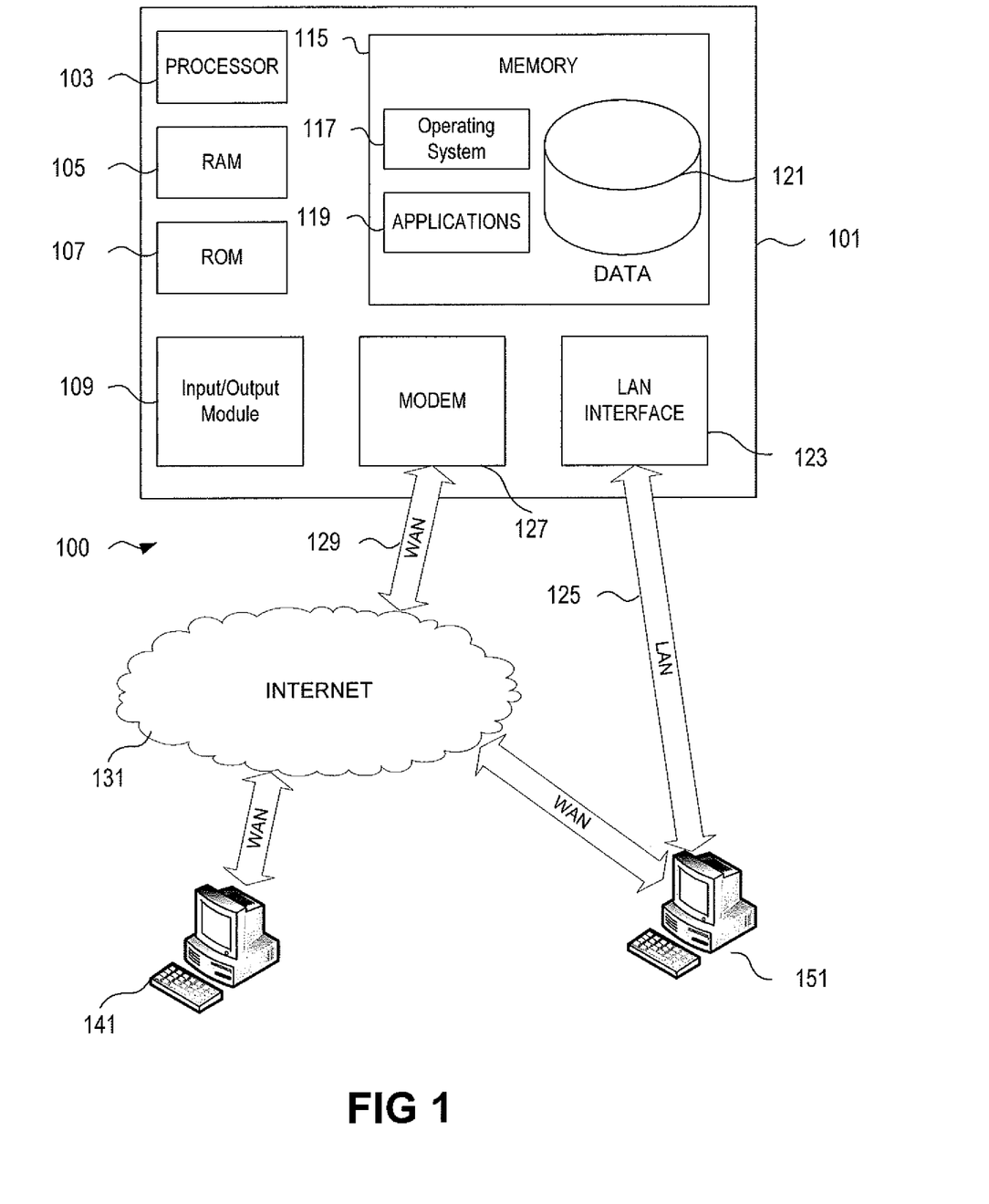
FIG. 1 illustrates a schematic diagram of a digital computing environment in which certain aspects of the present disclosure of the system and method of protocol EDI exchange may be implemented.

FIG. 1 illustrates a block diagram of a computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with individuals, allowing interoperability between different elements of the business residing at different physical locations.

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, mobile computing devices, e.g., smart phones, wearable computing devices, tablets, distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
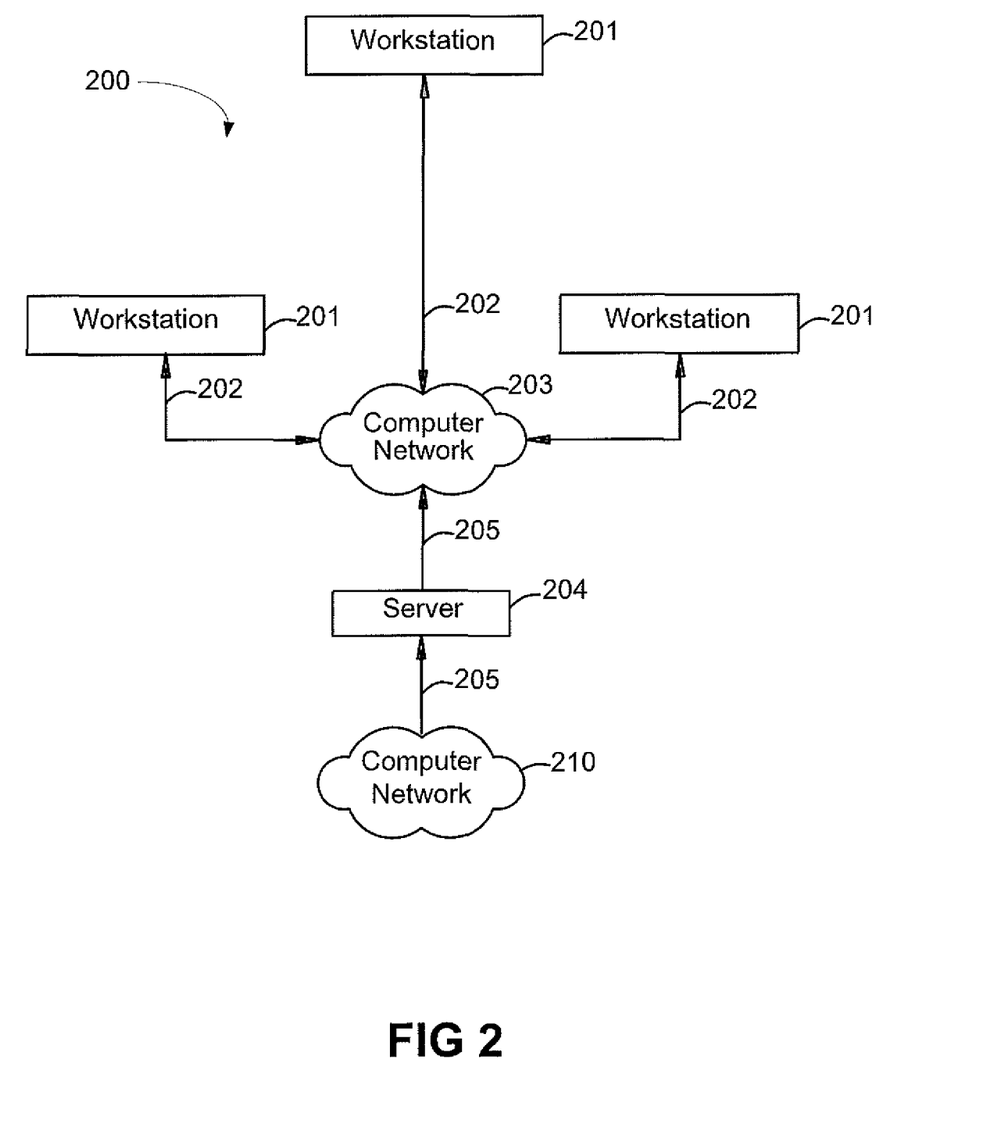
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer network 203 that is linked via communications links 205 to server 204. In system 200, server 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, and the like.

Figure 3:
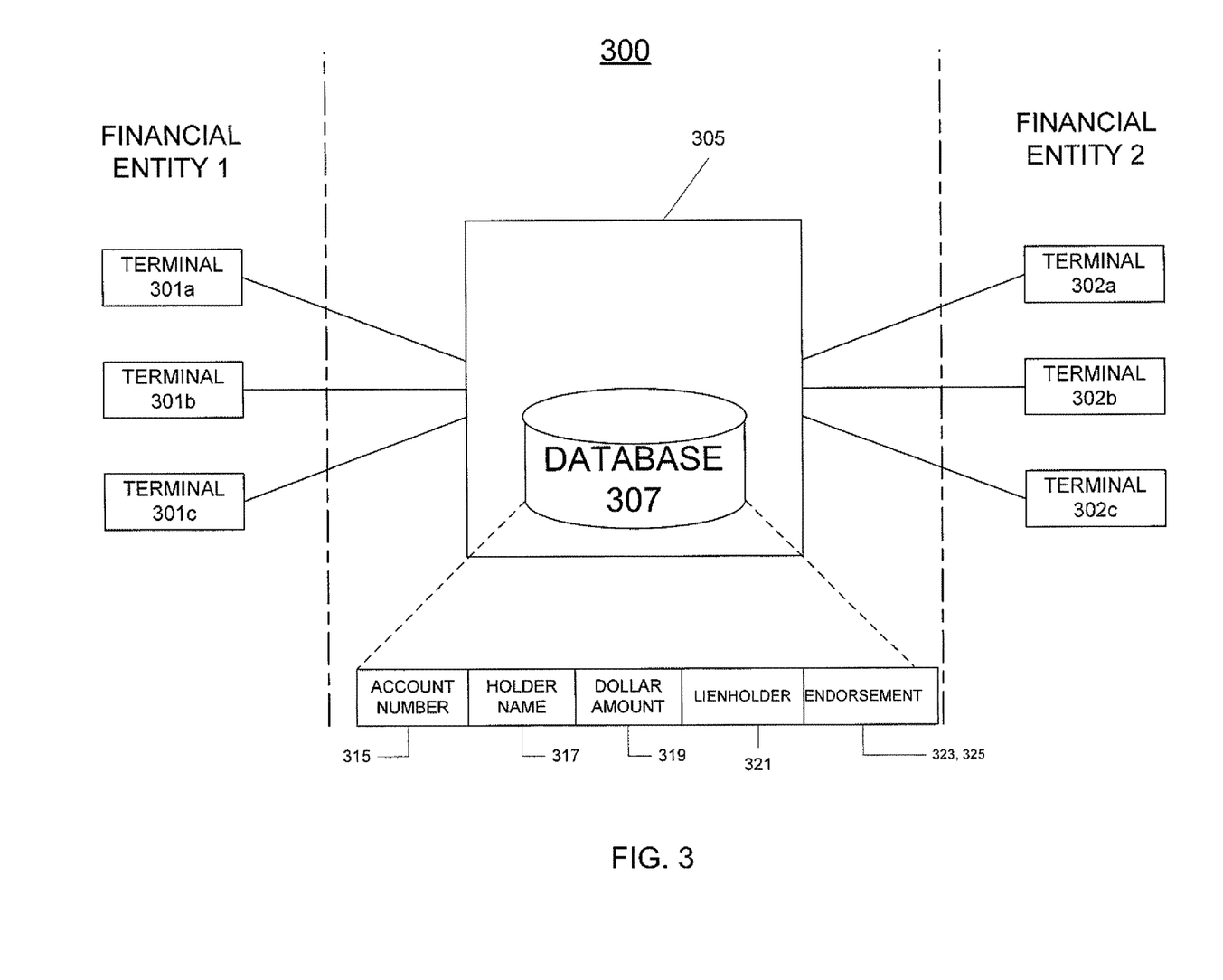
FIG. 3 is an illustrative functional block diagram of workstations and servers that may be used to implement the processes and functions of certain embodiments.

FIG. 3 illustrates an example of representative infrastructure according to some embodiments of the present invention. The different financial entity users 301a-301c, via terminals/workstations, electronically communicates with a plurality of different financial entities (such as, lienholders) terminals 302a-302c, through the processing system 300 including server 305 and database 307. In one embodiment, users execute commands with terminals/workstations to exchange information with the processing system 300. These terminals may be standard personal computers as are known in the art. In alternative embodiments, the users may use hand-held or other portable electronic devices as known in the art to communicate with the system 300. The system includes, for example and without limitation, server 305. Server 305 may include a mail server, which may be used to receive and send data via email or over the internet. The system 300 may use various attribute data in the Electronic Data Interchange (EDI) format as discussed in the foregoing. Server 305 can process an EDI messages sent through the system 300.

FIG. 3 is merely illustrative and the number of, users and/or user terminals, financial entities, servers and databases is not in any way limited. Furthermore, although various embodiments are described in the context of a single system, one of ordinary skill in the art may appreciate that the described functionality may be implemented across multiple systems. Moreover, a web site may be mirrored at additional systems in the network and, if desired, one or more management systems or other computer resources may be used to facilitate various functions. The computer program at the system 300 includes appropriate screen routines for generating a set of screens that together comprise a graphical user interface for the site.

The system 300 can provide messages in the communication cycle in an authenticated format, secure for each party that would be invited or authorized to be a part of the multiple endorsement processing service. In some constructions, would have to meet certain factors of data security. For example, an IPSEC circuit is commonly to pertain to IP Security, a set of protocols to support secure exchange of packet at the IP layer in a TCP/IP network system. IPSEC systems have been deployed widely to implement Virtual Private Networks (VPNs). Under an IPSEC system, at least two encryption modes are supported: Transport and Tunnel. Transport mode encrypts only the payload portion of each packet, but leaves the header. The Tunnel mode encrypts both the header and the payload. On the receiving side, an IPSEC-compliant device decrypts each packet. The methods and features recited herein further may be implemented through any number of non-transitory computer readable media that are able to store computer readable instructions. Examples of non-transitory computer readable media that may be used include RAM, ROM, EEPROM, flash memory or other memory technology, CD-ROM, DVD, or other optical disc storage, magnetic cassettes, magnetic tape, magnetic storage and the like.

According to some aspects, a centralized system 300 provides insurance companies and lienholders efficiency for processing claims for payment and endorsement. In one construction, the system 300 provides messaging back and forth that inputs requests for approval of the lien holder. The system 300 enables the person reviewing the request to authorize it or not, via electronic methods or automated electronic data processing. If the system 300 authorize the funds, an EDI message is sent to the central system 300 that will provide the information to the insurance company whether the funds can be released or not.

Referring to FIG. 3, in one aspect, the insurance company intends to enter in a payment to an insurance policyholder for an amount for a particular reason. The system may use various attribute data in the Electronic Data Interchange (EDI) format. EDI messages can be electronically processed according any number of formats and data sequences. In one case, the EDI format, may include an account number/loan number attribute 315 (such as a policyholder identifier), a policyholder name attribute 317, a dollar amount of the claim (claim amount attribute 319), and lienholder attribute data 321, and endorsement request 323 or endorsement code 325. In the processing system, the insurance company may inform the lienholder of a pending payment and seeks an endorsement or electronic signature from lienholder to release the funds to the policyholder. The system 300 acts as a centralized hub that connects insurance companies and lienholders that hold the loans in order to create pre-endorsement situation environment to release funds to the policy holder.

The steps that follow in the FIGS. 4A-C and 5 may be implemented by one or more of the components in FIGS. 1, 2 and 3 and/or other components, including other computing devices.

Figure 4A:
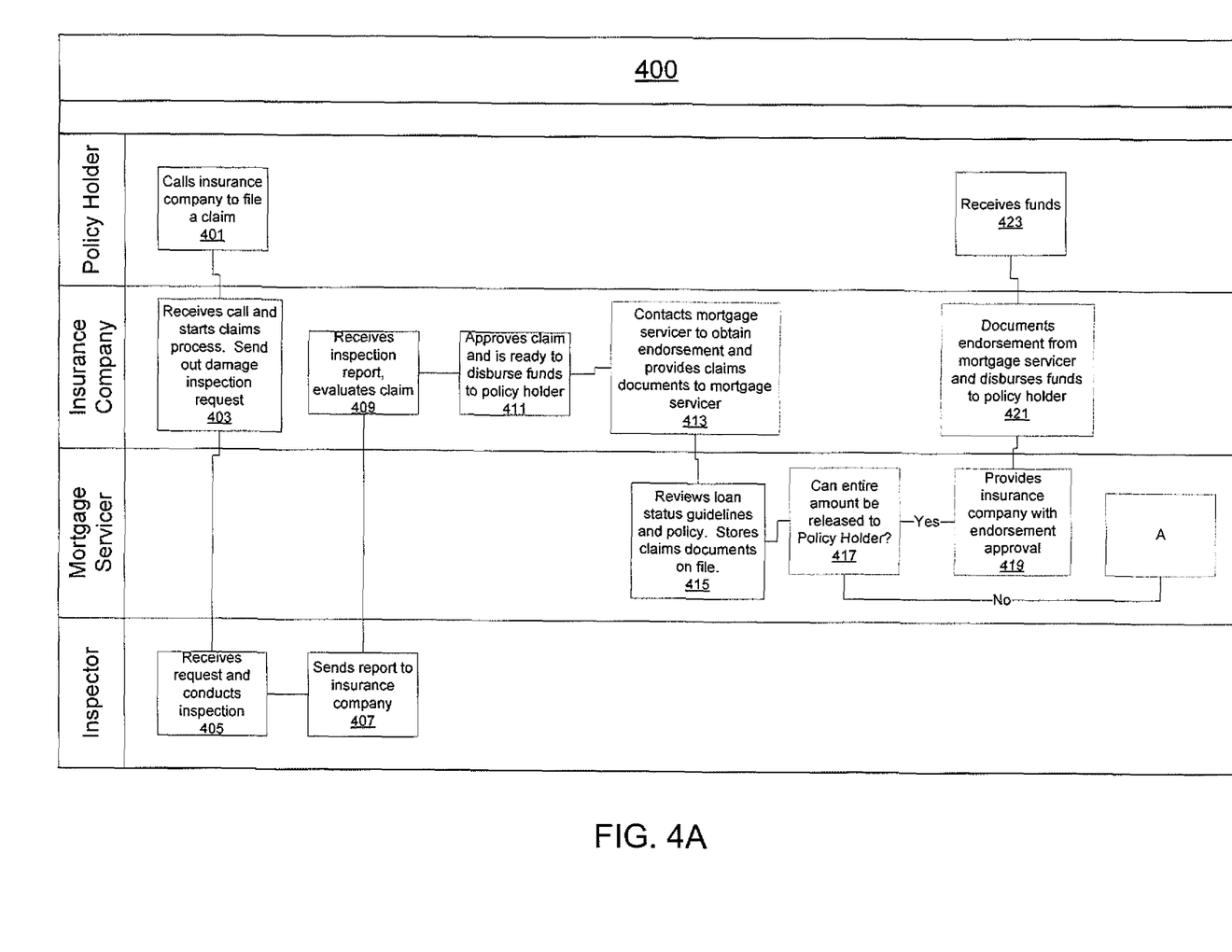
FIGS. 4A-C is an example flow chart of an illustrative method for in accordance with at least one aspect of the present disclosure.
Figure 4B:
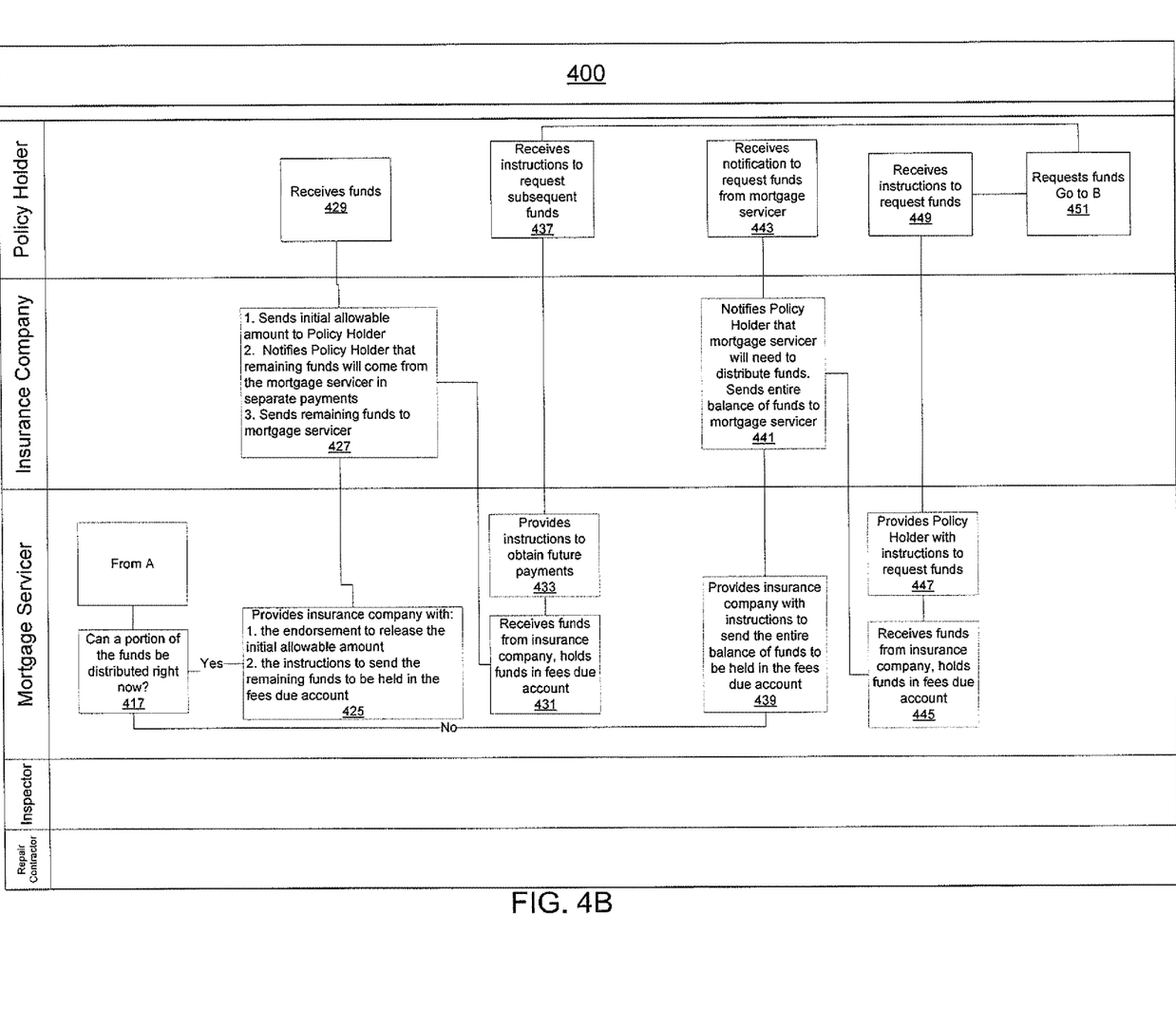
Figure 4C:
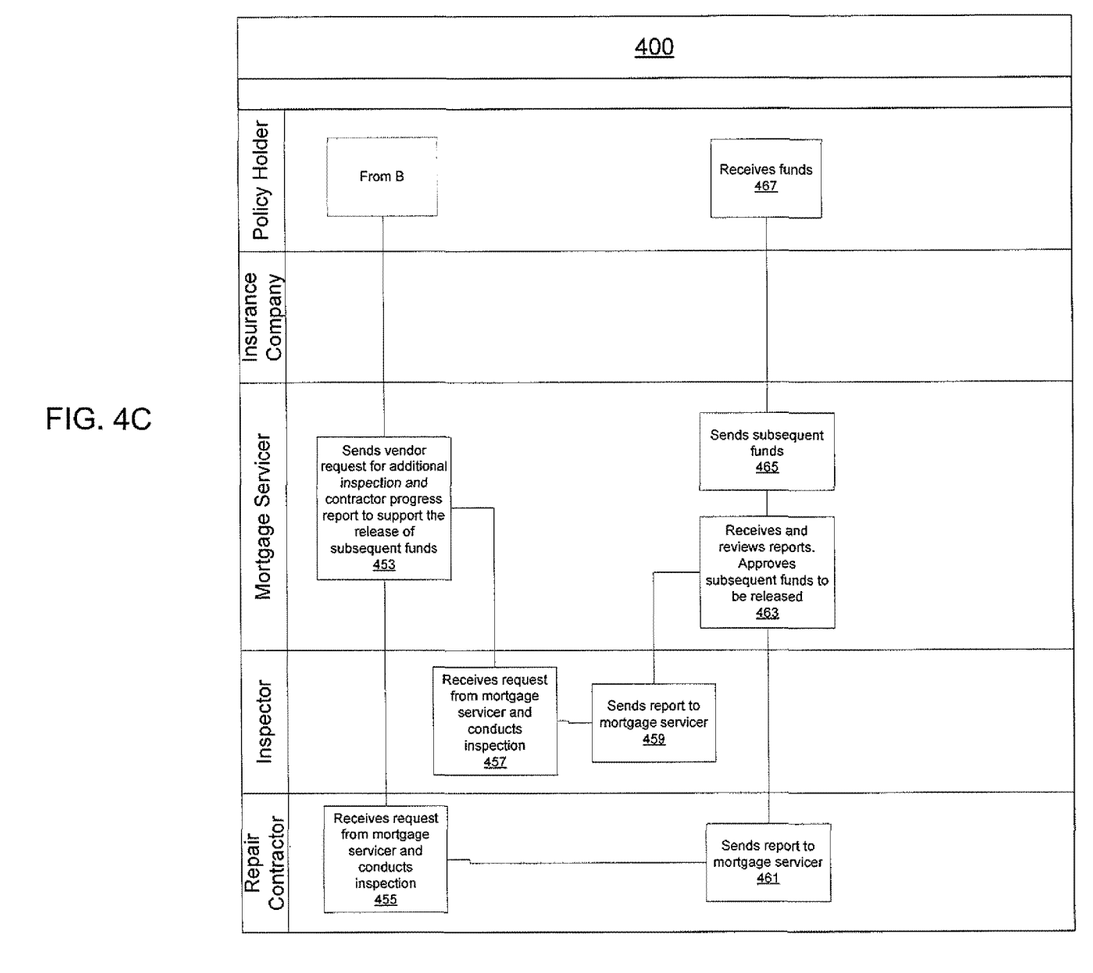

Referring to FIGS. 4A-C, in general, system 300 electronically maintains a plurality of accounts for users associated with a first financial entity (e.g., insurance company) and a second financial entity (e.g., bank, lienholder, or servicing company for lienholder) in a database 121. In such an example, the separate account data may be stored within a memory/database, such as memory 115 and/or RAM 105 in FIG. 1 or database 307 of FIG. 3. The system 300 electronically, receives EDI data representative of a monetary fund amount, and an endorsement request associated with at least one account requiring multiple endorsements. In one case, the endorsements may include the endorsement of the user and endorsement of the second financial entity. The system 300 electronically determines whether the endorsement request by the second financial entity is in accordance with a predetermined policy of the second financial entity. The predetermined policy may include various factors and criteria, which may include payment history of the user with the second financial entity and the amount of the monetary funds over a threshold amount. At least one threshold amount could be a percentage of the total amount of the balance of the lien, such as 2% to 10%. Then, responsive to the endorsement request being approved by the second financial entity in accordance with the predetermined policy, EDI data representative of the endorsement may be electronically transmitted to the first financial entity. Subsequently, system 300 enables the distribution of the amount of monetary funds to the user via electronic money.

Nevertheless, the first financial entity (e.g., insurance company) and a second financial entity (e.g., bank, lienholder, or servicing company for lienholder) and their customers have the ability to inquire the endorsement and payment status of a particular insurance claim or a set of insurance claims. The steps that follow in the FIGS. 4A-C and 5 can be implemented to include a computer readable transaction history or log of the status within process flows that can be maintained or otherwise stored within a memory/database, such as memory 115 and/or RAM 105 in FIG. 1 or database 307 of FIG. 3. In one construction, the steps that follow in the FIGS. 4A-C and 5 can be implemented where the user or financial entities can receive inquiries, via an automatic push notification or a report that sends to the inquirer an electronic mail, text messaging via Short Messaging Service (SMS) component of phone, web, or mobile communication systems, using standardized communication protocols that allow the exchange of short text messages between fixed line or mobile phone devices. In another manner, the user or financial entities can receive inquiries via a pull format where the inquirer initiates the query at various steps and the notification can be electronic mail or SMS technology.

Referring to FIG. 4C process flow 400, in Step 401, the policyholder can contact the insurance company to file a claim or enter electronic data via EDI to a webpage, for example. In Step 403, the insurance company receives the initial contact and starts a claims payment process. The insurance company may send out a damage inspection request to an inspector. In Step 405, the inspector conducts the inspection at the claimant's property. The property can be a physical structure of real property as such as a house.

In other examples, the personal property, such as a vehicle, automobile, motorcycle, boat and other property insured and having a lien thereon. In Step 407, the inspector sends the report of their findings to the insurance company. In Step 409, the insurance company receives the inspection report and evaluates the claim for payment using the insurance company standards. In Step 411, the insurance company may approve the claim and will be ready to disburse funds to the policy holder. In Step 413, the insurance company contacts the mortgage servicer (in the case of real property) to obtain an endorsement and provides the claim documents to the mortgage servicer via EDI using system 300. The account data associated with a plurality of users (e.g., policy holders accounts) may be maintained in a computer readable database 121. In Step 415, the mortgage servicer reviews the loan status of the policy holder and various predetermined guidelines and policies.

In Step 417, the mortgage servicer determines if the entire amount of the monetary funds can be released to the policy holder. In the case that the entire amount of the funds can be released the process flow to Step 419 in which the mortgage servicer may provide the insurance company with endorsement approval code. Flowing to Step 421, the insurance company may document the endorsement from the mortgage servicer and disburse the funds to the policy holder. In Step 423, the policy holder will receive a funds deposited notification or the instructions to receive the funds.

As shown in FIG. 4B, referring to back to Step 417, in the case that that the entire of funds cannot be released to the policy holder, the mortgage servicer determines whether a portion of the funds can distributed shortly. If the answer in Step 417 is in the affirmative, then the process flows to Step 425. In Step 425, the mortgage servicer sends via system 300 an EDI message to the insurance company with an endorsement code to release the initial allowable amount of the total amount of the monetary funds and an EDI message including instructions to send the remaining funds to be held in the fees due account. In Step 427, the insurance company sends initial allowable amount to policy holder, notifies via an electronic message to policy holder that the remaining funds will come from the mortgage servicer in separate payments; and sends remaining funds to mortgage servicer. In Step 429, the policy holder receives the initial allowable amount of funds. In Step 431, the mortgage servicer receives funds held back from the insurance company in fees due account. In Step 433, the mortgage servicer transmits an electronic message or other notification to the policy holder with instructions to obtain the future payments of the funds held back. In Step 437, the policy holder receives the instructions to request subsequent funds. In Step 451, policy holder requests funds from the mortgage servicer.

Still referring to FIG. 4B, if the answer in Step 417 is in the negative, then the process flows to Step 439. In Step 439, the mortgage servicer send the insurance company instructions via EDI message to send the entire balance of funds to be held in the fees due account. In Step 441, the insurance company notifies policy holder that mortgage servicer will need to distribute funds and sends the entire balance of funds to mortgage servicer. In Step 443, the policy holder receives notification to request funds from the mortgage servicer. Subsequent to Step 441, in Step 445, the mortgage servicer receive funds insurance company and holds the funds in a fees due account. In Step 447, the mortgage servicer provide policy holder with instructions to request funds. This can be by electronic messaging and other electronic notification methods. In Step 449, the policy holder receives the instructions to request funds from the mortgage servicer. In Step 451, policy holder requests funds from the mortgage servicer.

Referring to FIG. 4C, in Step 453, the mortgage servicer receives the request for funds and sends to the repair contractor and a request for additional inspection and contractor progress report to support the release of subsequent funds. In step 455, the repair contractor receives the progress report request, and in Step 461, sends the progress report to the mortgage servicer. In Step 457, the inspector receives the request from the mortgage servicer and conducts an inspection on the property. In Step 459, the inspector sends the inspection report to the mortgage servicer. After the inspections and progress reports, in Step 463, the mortgage service receives both reports and evaluates whether to approve the funds distribution. And in Step 465, the mortgage servicer enables release of funds to the policy holder. In Step 467, the policy holder receives the funds to end the processing. The funds can be receive via electronic funds transfer, for example.

Figure 5:
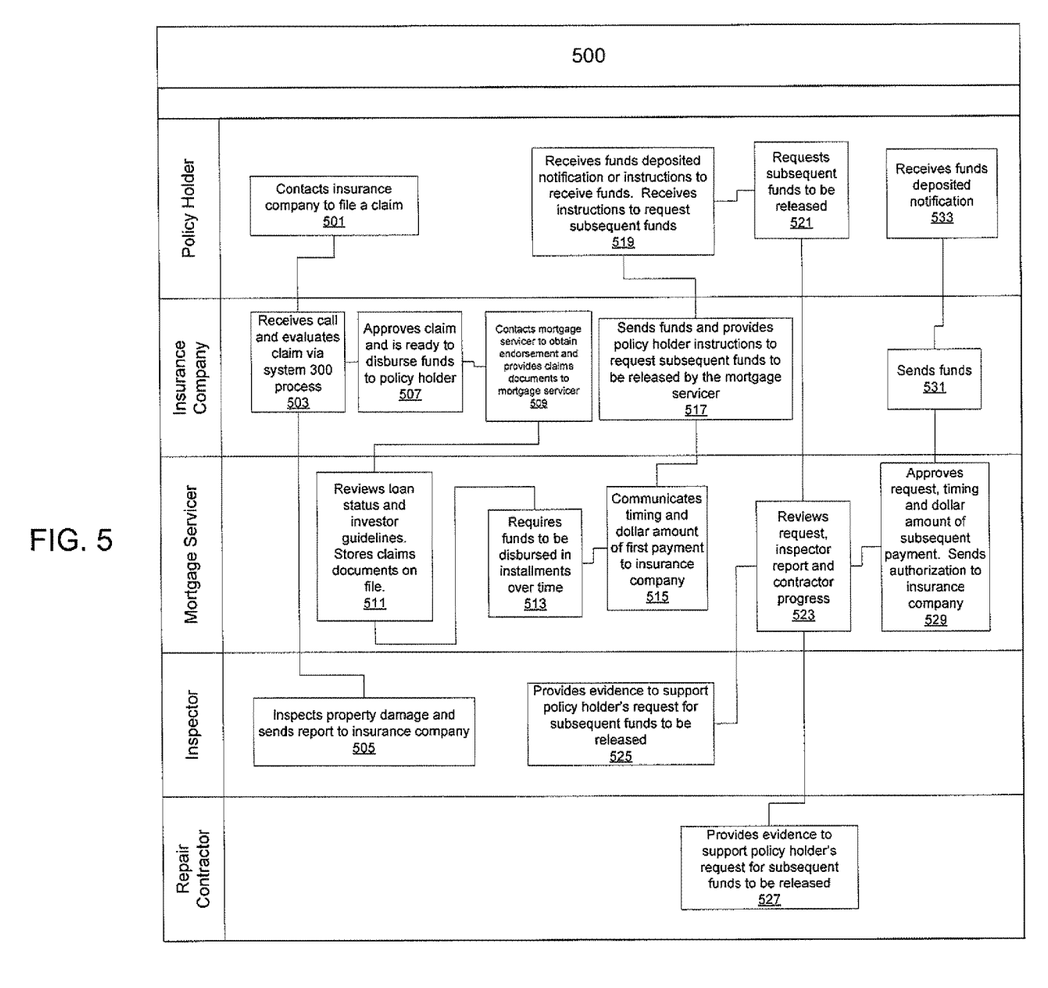
FIG. 5 is an example flow chart of an alternative illustrative method for in accordance with at least one aspect of the present disclosure.

Referring to FIG. 5 the process 500, in Step 501, the policy holder contacts the insurance company to file a claim. In Step 503, the insurance company will receive the call and start the claims process. The insurance company may make a damage inspection request. In Step 505, the inspector will receive the damage inspection request and conduct their inspection. The inspector will send out a report to the insurance company. In Step 507, the insurance company approves the claim and is ready to disburse funds to the policy holder. In Step 509, the insurance company contacts the mortgage servicer to obtain endorsement and may provide the claim documents to the mortgage servicer via system 300. The system 300 may use various attribute data in the Electronic Data Interchange (EDI) format. In Step 511, the mortgage servicer reviews the loan status and policy guidelines for providing the funding endorsement. In Step 513, the mortgage servicer may require funds to be disbursed in installments over time. In Step 515, the mortgage servicer will provide instructions (EDI format) for the insurance company to sends timing and funding amount of first payment to insurance company. In Step 517, the insurance company sends funds to policy holder and notifies the policy holder that the funds will come from the mortgage servicer in separate payments.

In Step 519, the policy holder receives notification from the insurance company. In Step 521, the policy holder request funds to be released by the mortgage servicer. In Step 525, the mortgage servicer sends an inspection request for evidence (e.g., photos, permits inspections) to support the release of subsequent funds. The inspector receives the request from mortgage servicer and conducts the inspection. In Step 527, the repair contractor receives the request from the mortgage servicer and conducts a progress report to support the release of subsequent funds. The repair contractor sends their report to the mortgage servicer. In Step 523, the mortgage servicer receives and reviews the reports from the inspector and repair contractor. In Step 529, the mortgage servicer approves the subsequent funds to be released, timing of payments and sends an endorsement approval to the insurance company. The system 300 may use various attribute data in the Electronic Data Interchange (EDI) format. In Step 531, the insurance company sends the subsequent funds to the policy holder. In Step 533, the policy holder receives funds deposited notification via electronic message to an electronic device in EDI format or via electronic mail over the internet. The electronic device can be terminals or work stations shown in FIGS. 1 and 2.

While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present disclosure. The description is thus to be regarded as illustrative instead of restrictive on the present disclosure.

The invention claimed is:

1. A computer implemented method using a protocol exchange server providing bi-directional exchange of secure data protocol attributes between a first computer system and a second computer system, the method comprising:
    at a protocol exchange server for bi-directional exchange of a tunnel mode and transport mode secure data protocol attributes between a first computer system and a second computer system, electronically storing a plurality of computer readable attribute records in a computer readable record database for users associated with the first computer system and the second computer system,
    mirroring a web site at the protocol exchange server to a third computer system;
    at the protocol exchange server, using an encrypted virtual private network (VPN) communications data link, electronically, receiving data from a first Electronic Data Interchange (EDI) message payload including attribute data representative of a stored value amount, and an attribute data approval request associated with at least one record from the computer readable record database requiring multiple approvals, wherein the first EDI message payload includes a record header and a third party data attribute being associated with the second computer system;
    at the protocol exchange server, electronically, extracting data values from the first Electronic Data Interchange (EDI) message payload including the record header, the third party data attribute, the attribute data representative of a stored value amount, the attribute data approval request;
    at the protocol exchange server, electronically processing and determining via executing computer readable instructions comparing the extracted attribute data representative of the stored value amount of the first EDI message payload to a predetermined threshold stored value associated with at least one record related to the second computer system so as to determine whether the extracted stored value amount is less than the predetermined threshold stored value; if true, then generating a data attribute approval code associated with the attribute data approval request of the first EDI message payload to a computer processor associated with the second computer system; and
    at the protocol exchange server, responsive to the attribute data approval request and attribute data of the stored value associated with the first EDI message payload having the data attribute approved code; transmitting via an encrypted VPN data link, a second EDI message payload including at least the record identifier attribute data, and attribute data representative of the multiple approvals to the first computer system.

2. The method of claim 1, further comprising electronically enabling transmission of a third EDI message payload including data representative of an approval notification to an electronic device associated with the user.

3. The method of claim 2, wherein the third EDI message payload including the data representative of an approval notification comprise a Short Messaging Service (SMS) electronic message or electronic mail message.

4. The method of claim 1, wherein responsive to the step of the attribute data approval request and attribute data of the stored value associated with the first EDI message payload being in accordance with data representative of payment history, further comprises transmitting the second EDI message payload including attribute data representative of an approval code.

5. The method of claim 1, wherein the multiple approvals includes the endorsement of the user and the endorsement of the second computer system.

6. The method of claim 1, wherein responsive to the step of the attribute data approval request and attribute data of the stored value associated with the first EDI message payload being in accordance with the predetermined policy, enabling distribution of the amount of monetary value to the user.

7. The method of claim 1, wherein responsive to the step of the attribute data approval request and attribute data of the stored value associated with the first EDI message payload being in accordance with the predetermined policy, includes transmitting a third EDI message payload including attribute data representative of a first portion of the stored value to the first system, the first portion being less than the stored value.

8. The method of claim 7, further including a step of transmitting a fourth EDI message payload including attribute data representative of a second portion of the stored value to the first computer system, the second portion being defined the balance of the stored value amount minus the first portion.

9. The method of claim 8, wherein responsive to the step of the attribute data approval request and attribute data of the stored value associated with the first EDI message payload being in accordance with the predetermined policy, includes transmitting EDI data representative of the second portion to a fee due account.

* * * * *